(12) United States Patent
Chella et al.

(10) Patent No.: US 11,119,845 B2
(45) Date of Patent: Sep. 14, 2021

(54) TECHNIQUES FOR SCHEDULED ANTI-ENTROPY REPAIR DESIGN

(71) Applicant: NETFLIX, INC., Los Gatos, CA (US)

(72) Inventors: Vinay Chella, Santa Clara, CA (US); Joseph Lynch, Palo Alto, CA (US); Ajay Upadhyay, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 251 days.

(21) Appl. No.: 16/367,069

(22) Filed: Mar. 27, 2019

(65) Prior Publication Data

US 2019/0303234 A1 Oct. 3, 2019

Related U.S. Application Data

(60) Provisional application No. 62/648,907, filed on Mar. 27, 2018.

(51) Int. Cl.
| | |
|---|---|
| *G06F 11/00* | (2006.01) |
| *G06F 11/07* | (2006.01) |
| *G06F 16/27* | (2019.01) |
| *G06F 9/48* | (2006.01) |
| *H04L 29/08* | (2006.01) |

(52) U.S. Cl.
CPC ........ *G06F 11/0793* (2013.01); *G06F 9/4843* (2013.01); *G06F 9/4881* (2013.01); *G06F 11/0709* (2013.01); *G06F 11/0751* (2013.01); *G06F 16/273* (2019.01); *H04L 67/10* (2013.01)

(58) Field of Classification Search
CPC ............. G06F 11/1402; G06F 11/1446; G06F 11/1448; G06F 11/1458; G06F 11/079

USPC ....................................................... 714/1–57
See application file for complete search history.

(56) References Cited

U.S. PATENT DOCUMENTS

| | | | | |
|---|---|---|---|---|
| 6,098,078 | A * | 8/2000 | Gehani | ................... G06F 16/27 707/610 |
| 6,941,287 | B1 * | 9/2005 | Vaidyanathan | ...... G06K 9/6229 706/12 |
| 2003/0221095 | A1 * | 11/2003 | Gaunt | ................. G06F 11/1417 713/1 |

(Continued)

OTHER PUBLICATIONS

International Search Report for application No. PCT/US2019/024417 dated Jul. 8, 2019.

(Continued)

*Primary Examiner* — Sarai E Butler
(74) *Attorney, Agent, or Firm* — Artegis Law Group, LLP

(57) ABSTRACT

Various embodiments of the invention disclosed herein provide techniques for performing distributed anti-entropy repair procedures across a plurality of nodes in a distributed database network. A node included in a plurality of nodes within the distributed database network determines, before all other nodes included in the plurality of nodes, that a first anti-entropy repair procedure has ended. The node determines that a second anti-entropy repair procedure is ready to begin. The node generates a schedule for executing one or more operations associated with the second anti-entropy repair procedure. The node writes the schedule to a shared repair schedule data structure to initiate the second anti-entropy repair procedure across multiple nodes included in the plurality of nodes. Each of the nodes included in the plurality of nodes then performs a node repair based on the schedule.

20 Claims, 6 Drawing Sheets

(56) References Cited

U.S. PATENT DOCUMENTS

| | | | | |
|---|---|---|---|---|
| 2010/0268986 | A1* | 10/2010 | Verdoorn, Jr. | G06F 15/16 714/10 |
| 2013/0117227 | A1* | 5/2013 | Kruglick | G06F 16/27 707/626 |
| 2013/0120449 | A1* | 5/2013 | Ihara | G02B 27/017 345/633 |
| 2014/0236902 | A1* | 8/2014 | Zhu | G06F 11/1446 707/654 |
| 2015/0113324 | A1* | 4/2015 | Factor | G06F 3/0647 714/20 |
| 2015/0199224 | A1* | 7/2015 | Mihnev | H04L 43/08 714/37 |
| 2015/0205661 | A1* | 7/2015 | Kaus | G06F 11/0793 714/34 |
| 2016/0164739 | A1* | 6/2016 | Skalecki | H04L 41/12 370/389 |
| 2016/0292249 | A1* | 10/2016 | Vasanth | G06F 11/006 |
| 2017/0026441 | A1* | 1/2017 | Moudy | G06F 9/5027 |
| 2017/0180599 | A1* | 6/2017 | Nitta | H04N 1/32683 |
| 2018/0225324 | A1* | 8/2018 | Pazos | G06F 16/2365 |

OTHER PUBLICATIONS

Reaper Project, "Reaper Specific Settings", URL : https://web.archive.org/web/20180316064608/http://cassandra-reaper.io/docs/configuration/reaper specific/, Reaper Online Documentation, Mar. 16, 2018, pp. 1-9.

Reaper Project, "Reaper with multi DC clusters", URL : https://web.archive.org/web/20180314211841/http://cassandra-reaper.io/docs/usage/multi_dc/, Reaper Online Documentation, Mar. 14, 2018, pp. 1-4.

Reaper Project, "Cassandra Backend", URL : https://web.archive.org/web/20180313200125/http://cassandra-reaper.io/docs/backends/cassandra/, Reaper Online Documentation, Mar. 13, 2018, pp. 1-4.

Reaper Project, "Welcome to the Cassandra Reaper documentation!", URL : https://web.archive.org/web/20180324054004/http://cassandra-reaper.io/docs, Reaper Online Documentation, Mar. 24, 2018, pp. 1-4.

Apache Cassandra Project, "How is data maintained?", URL : https://docs.datastax.com/en/archived/cassandra/2.2/zip/cassandra22.zip, Apache Cassandra 2.2 Distribution, Jul. 27, 2017, pp. 1-5.

Apache Cassandra Project, "When to run anti-entropy repair", URL : https://docs.datastax.com/en/archived/cassandra/2.2/zip/cassandra22.zip, Apache Cassandra 2.2 Distribution, Jul. 27, 2017, pp. 1-2.

Apache Cassandra Project, "Manual repair: Anti-entropy Repair", URL:https://docs.datastax.com/en/archived/cassandra/2.2/zip/cassandra22.zip, Apache Cassandra 2.2 Distribution, Jul. 27, 2017, pp. 1-6.

Apache Cassandra Project, "Nodetool Repair", URL:https://docs.datastax.com/en/archived/cassandra/2.2/zip/cassandra/2.2.zip, Apache Cassandra 2.2 Distribution, Jul. 27, 2017, pp. 1-3.

Dejanovski, Alexander, "Real world tales of repair", Apache: Big Data North America 2017, May 16, 2017, 98 pages.

Decandia et al., "Dynamo: Amazon's Highly Available Key-value Store", Proceeding SOSP '07? ACM SOSP, Proceedings of the ACM Symposium on Operating Systems Principles, Oct. 14, 2007, pp. 205-220.

Goncalves et al., "DottedDB: Anti-Entropy without Merkle Trees, Deletes without Tombstones", 2017 IEEE 36th Symposium on Reliable Distributed Systems (SRDS), Sep. 26, 2017, pp. 194-203.

"Reaper Specific Settings", URL: https://web.archive.org/web/20180313200026/http://cassandra-reaper.io/docs/configuration/reaper specific/, Mar. 13, 2018, 9 pages.

"Reaper with multi DC clusters", URL: https://web.archive.org/web/20180314211841/http://cassandra-reaper.io/docs/usage/multi de/, Mar. 14, 2018, pp. 1-4.

"Cassandra Backend", URL:https://web.archive.org/web/20180313200125/http://cassandra-reaper.io/docs/backends/cassandra/, Mar. 13, 2018, pp. 1-4.

"Welcome to the Cassandra Reaper documentation", URL:https://web.archive.org/web/20180324054004/http://cassandra-reaper.io/docs, Mar. 24, 2018, pp. 1-4.

\* cited by examiner

TECHNIQUES FOR SCHEDULED ANTI-ENTROPY REPAIR DESIGN

CROSS-REFERENCE TO RELATED APPLICATIONS

This application claims benefit of U.S. patent application Ser. No. 62/648,907, filed Mar. 27, 2018, which is hereby incorporated herein by reference.

BACKGROUND OF THE INVENTION

Field of the Invention

The present invention relates generally to distributed computer systems and, more specifically, to techniques for scheduled anti-entropy repair design.

Description of the Related Art

In certain distributed database networks, collections of data is copied and stored in multiple computing devices, referred to herein as "nodes," throughout the distributed database network. The multiple copies of a collection of data are referred to herein as "replicas." Storing replicas throughout the distributed database network provides redundancy against data loss, whereby if one of the replicas becomes corrupted, then the remaining replicas may be accessed in order to retrieve the corresponding data. Further, when replicas are stored in nodes that are geographically diverse, a user requesting access to a particular collection of data can retrieve the data from the node that is closest to the computing device of the user. As a result, latency between requesting access to a replica and retrieving the replica may be reduced.

Over time, data in one replica may become inconsistent with data in other corresponding replicas. As one example, a user accessing a particular replica on one node may modify a portion of the replica and then store the modified replica back onto the same node. As a result, the modified replica is inconsistent with the other replicas distributed throughout the distributed database network. To correct such inconsistencies, one of the nodes is designated as an anti-entropy repair coordinator. The designated anti-entropy repair coordinator then analyzes the differences between a subset of replicas for inconsistencies and updates the subset of replicas so that the subset of replicas becomes consistent. This process of analyzing and updating replicas is referred to herein as an "anti-entropy repair procedure," or, more simply, a "repair." With conventional repairs, users manually schedule repairs as an offline batch process via repair tools external to the distributed database. As a result, with conventional anti-entropy repair procedures, users are responsible for engineering and maintaining anti-entropy repair procedures for the nodes within the distributed database network.

One problem with the above approach for repairing nodes is that repair solutions and options are difficult for users to understand and execute properly. Simple anti-entropy repair procedures may be effective for distributed database networks that have a relatively small number of nodes, but such simple anti-entropy repair procedures may fail with a distributed database network that has tens of thousands of nodes. Similarly, anti-entropy repair procedures that may be effective for nodes that store replicas that are relatively small in size may fail for nodes that store replicas that are relatively large, and vice versa. As a result, engineering and maintaining anti-entropy repair procedures may be difficult for a distributed database network that has a fluctuating number of nodes and/or different sizes of replicas.

Another problem with the above approach for repairing nodes is that when the anti-entropy repair coordinator, and/or one or more other nodes, fail while a repair is in progress, the entire repair progress may be lost. As a result, the anti-entropy repair procedure needs to be restarted from the beginning, leading to a loss of hours or days of repair work that was performed prior to the failure. Further, the external anti-entropy repair procedure may not have full visibility of the state of the distributed database and the repair progress at the time of failure. Consequently, the anti-entropy repair procedure may have difficulty in determining what specific actions are needed to restart the repair. Yet another problem with the above approach for repairing nodes is that repairs often require significant use of disk storage, central processing unit (CPU) resources, and network bandwidth, which can significantly reduce the performance of the distributed database network.

As the foregoing illustrates, what is needed in the art are more effective techniques for repairing nodes in a distributed database network.

SUMMARY OF THE INVENTION

Various embodiments of the present application set forth a computer-implemented method for performing distributed anti-entropy repair procedures across a plurality of nodes in a distributed database network. The method includes determining, by a first node included in a plurality of nodes and before all other nodes included in the plurality of nodes, that a first anti-entropy repair procedure has ended. The method further includes determining, by the first node, that a second anti-entropy repair procedure is ready to begin. The method further includes generating a schedule for executing one or more operations associated with the second anti-entropy repair procedure. The method further includes writing the schedule to a shared repair schedule data structure to initiate the second anti-entropy repair procedure across multiple nodes included in the plurality of nodes.

Other embodiments of the present invention include, without limitation, a computer-readable medium including instructions for performing one or more aspects of the disclosed techniques, as well as a computing device for performing one or more aspects of the disclosed techniques.

At least one technical advantage of the disclosed techniques relative to the prior art is that anti-entropy repair procedures automatically scale to the number of nodes and to the varied size of the replicas in a distributed database network. As a result, the anti-entropy repair procedure adapts to each subset of data stored on a particular node in order to reduce the amount of disk access, CPU resources, and network bandwidth consumed, relative to conventional techniques. In addition, users are relieved from manually engineering and maintaining anti-entropy repair procedures as the number of nodes and the size of replicas change over time. Another technical advantage of the disclosed techniques relative to the prior art is that the anti-entropy repair procedure is distributed across the nodes. Further, once the failed nodes resume execution, the anti-entropy repair procedure may resume in relatively the same condition as when the failure occurred. Consequently, less or no repair progress is lost when one or more other nodes fail during a repair,

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
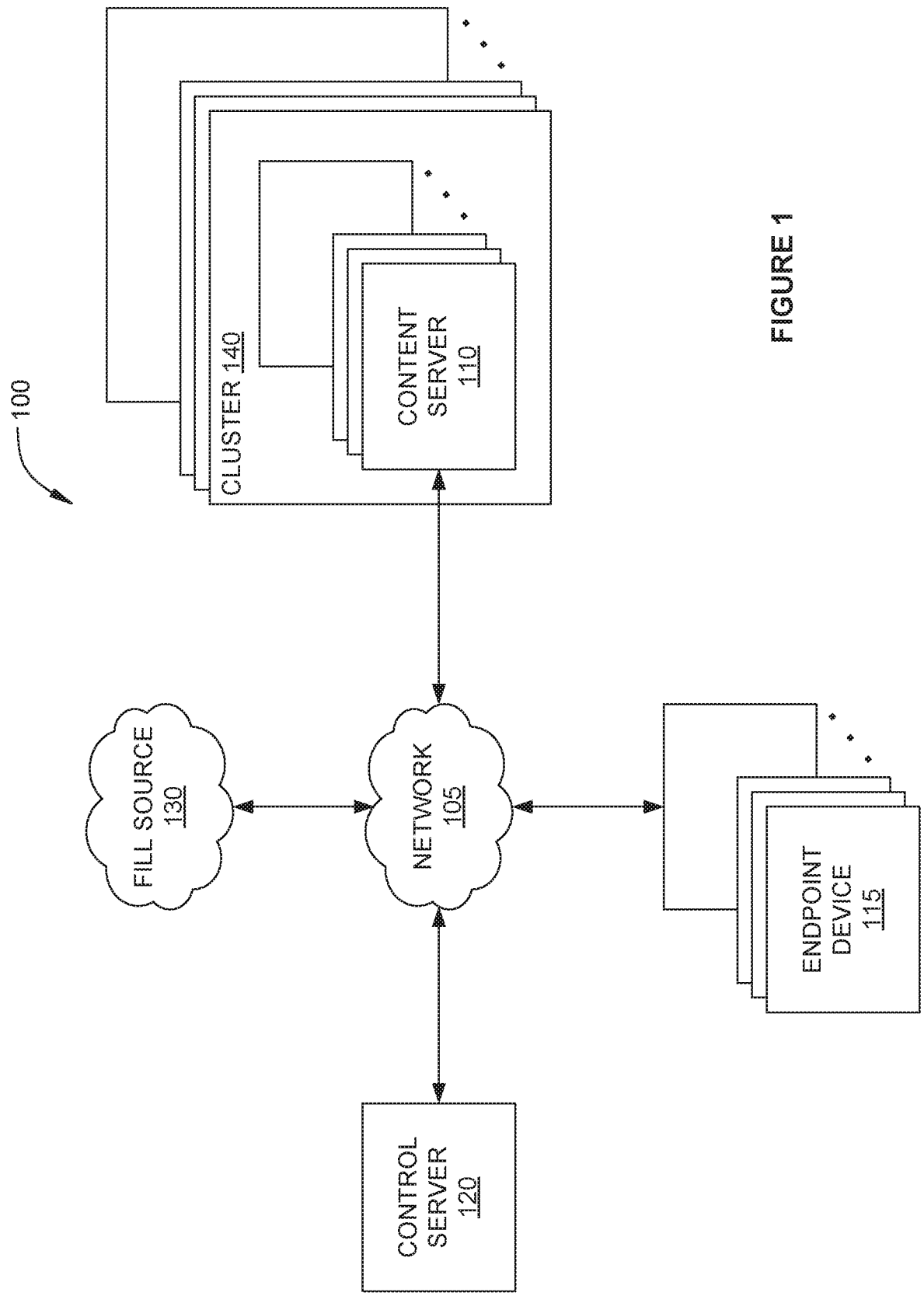
FIG. 1 illustrates a network infrastructure used to distribute content to content servers and endpoint devices, according to various embodiments of the invention.

FIG. 1 illustrates a network infrastructure 100 used to distribute content to content servers 110 and endpoint devices 115, according to various embodiments of the invention. As shown, the network infrastructure 100 includes clusters 140, a control server 120, and endpoint devices 115, each of which are connected via a communications network 105. Network 105 may be any suitable environment to enable communications among remote or local computer systems and computing devices, including, without limitation, wireless and wired LANs and internet-based WANs (Wide Area Networks).

Each endpoint device 115 includes, without limitation, a computing device that may be a personal computer, video game console, personal digital assistant, mobile phone, mobile device, or any other device suitable for implementing one or more aspects of the present invention. Each endpoint device 115 communicates with one or more content servers 110 via the network 105 to download content, such as textual data, graphical data, audio data, video data, and other types of data. The content servers 110 are also referred to herein as "caches," "compute nodes," or, more simply, "nodes." The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each cluster 140 includes one or more content servers 110. As further described herein, each cluster 140 is capable of independently executing an anti-entropy repair procedure with respect to the content server 110 included within the particular cluster 140. Each content server 110 includes, without limitation, a storage device that may be a standalone networked attached storage (NAS) system, a storage area-network (SAN), a cluster or "farm" of storage devices, a distributed storage architecture, or any other device suitable for implementing one or more aspects of the present invention. Additionally or alternatively, each content server 110 may include, without limitation, a computing device with a storage subsystem that may be a standalone server, a cluster or "farm" of servers, one or more network appliances, or any other device suitable for implementing one or more aspects of the present invention. Further, each content server 110 may include, without limitation, a web-server and a database, and may be configured to communicate with the control server 120 to determine the location and availability of various files that are tracked and managed by the control server 120.

More generally, each content server 110 stores groups of files called tables. Each table, in turn, consists of partitions, where a partition is a unit of data of arbitrary size. The size of a partition may be small, such as a single key-value pair, or large, such as one Gigabyte of data. Each content server 110 may further communicate with a fill source 130 and one or more other content servers 110 in order "fill" each content server 110 with copies of various files. In addition, the content servers 110 may respond to requests for files received from the endpoint devices 115. The files may then be distributed from the content server 110 or via a broader content distribution network. In some embodiments, the content servers 110 enable users to authenticate (e.g., using a username and password) in order to access files stored on the content servers 110.

The control server 120 may include, without limitation, a computing device that may be a standalone server, a cluster or "farm" of servers, one or more network appliances, or any other device suitable for implementing one or more aspects of the present invention. Although only a single control server 120 is shown in FIG. 1, in various embodiments multiple control servers 120 may be implemented to track and manage files.

In various embodiments, the fill source 130 may include an online storage service (e.g., Amazon® Simple Storage Service, Google® Cloud Storage, etc.) in which a catalog of files, including thousands or millions of files, is stored and accessed in order to fill the content servers 110. Although only a single fill source 130 is shown in FIG. 1, in various embodiments multiple fill sources 130 may be implemented to service requests for files.

Performing Distributed Anti-Entropy Repair Procedures Across a Cluster

Figure 2:
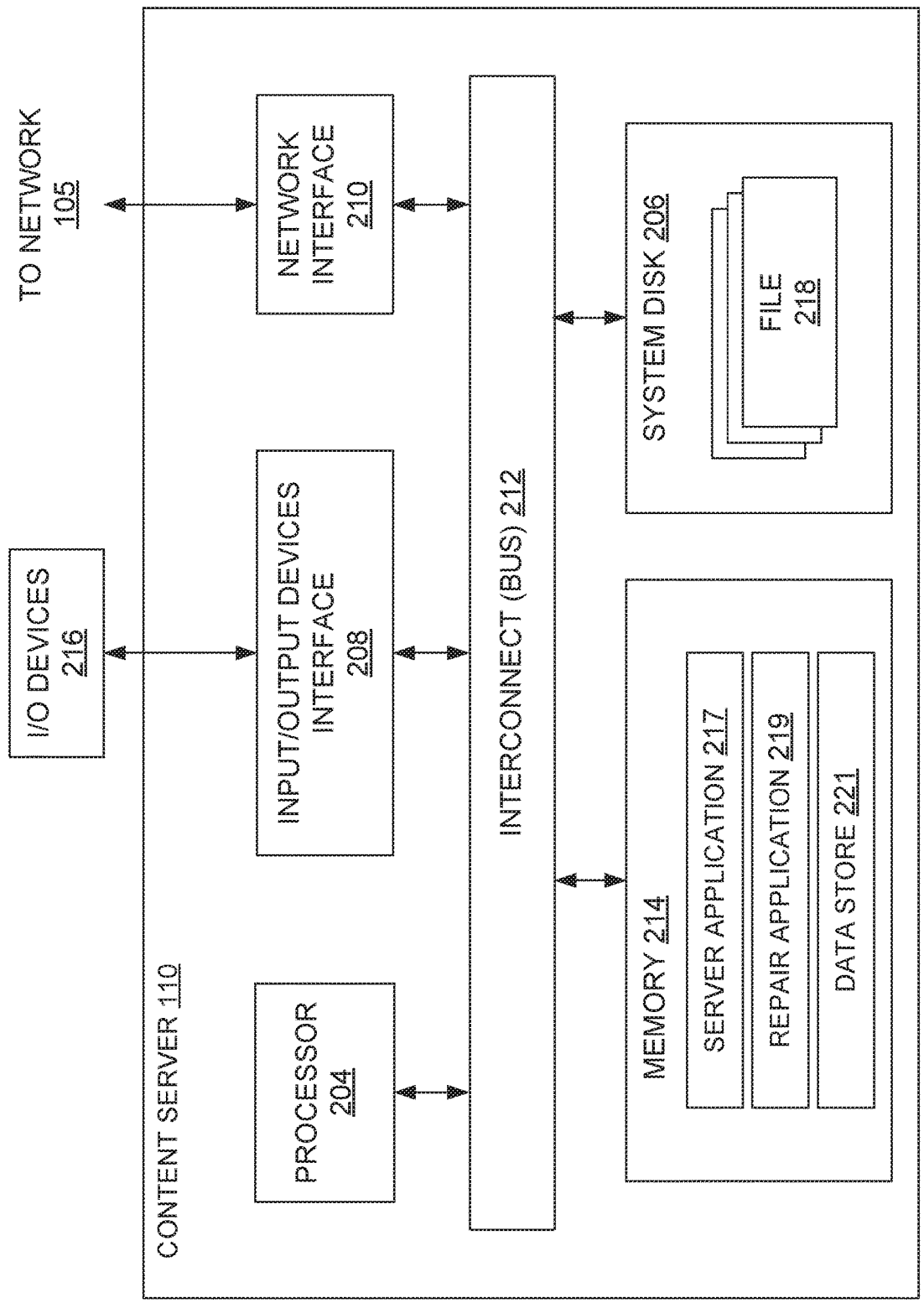
FIG. 2 is a more detailed illustration of the content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a processor 204, a system disk 206, an input/output (I/O) devices interface 208, a network interface 210, an interconnect 212, and a system memory 214.

The processor 204 is included to be representative of a single CPU, multiple CPUs, a single CPU having multiple processing cores, and the like. The processor 204 is configured to retrieve and execute programming instructions, such as a server application 217 and a repair application 219, stored in the system memory 214. Similarly, the processor 204 is configured to store application data (e.g., software libraries) and retrieve application data from the system memory 214. The interconnect 212 is configured to facilitate transmission of data, such as programming instructions and application data, between the processor 204, the system disk 206, the I/O devices interface 208, the network interface 210, and the system memory 214. The I/O devices interface 208 is configured to receive input data from the I/O devices 216 and transmit the input data to the processor 204 via the interconnect 212. For example, I/O devices 216 may include one or more buttons, a keyboard, a mouse, and/or other input devices. The I/O devices interface 208 is further configured to receive output data from the processor 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218, or, more specifically, partitions and/or records associated with one or more files 218, can then be retrieved by one or more endpoint devices 115 via the network 105. In some embodiments, the network interface 210 is configured to operate in compliance with the Ethernet standard.

The system memory 214 includes, without limitation, a server application 217, a repair application 219, and a data store 221. The data store 221 includes a server application data store, where data is stored and retrieved by the server application 217. In some embodiments, the data store 221 may also include a repair data store, where data is stored and retrieved by the repair application 219. Additionally or alternatively, the repair data store may reside in a data store that is external to the content server 110. In such cases, the repair application 219 may access the external repair data store via the network interface 210.

The server application 217 is configured to service requests for one or more partitions in one or more files 218 received from the endpoint device 115 and other content servers 110. When the server application 217 receives a request for one or more partitions within one or more files 218, the server application 217 retrieves the corresponding files 218 from the system disk 206 and transmits the materialized partition(s) to an endpoint device 115 or a content server 110 via the network 105. In performing these operations the server application 217 stores data in and retrieves data from the data store 221.

The repair application 219, when executed by the processor 204, performs one or more operations associated with the content server 110 of FIG. 1, as further described herein. In performing these operations the repair application 219 stores data in and retrieves data from the data store 221.

In operation, the repair application 219 executing on the processor 204 manages the execution of the anti-entropy repair procedures through repair state updates. In one embodiment, the repair application 219 manages and coordinates the execution of the anti-entropy repair procedures via a data structure that includes four types of state tables. These four state tables are referred to herein as repair_process, repair_sequence, repair_status, and repair_hook_status. For a particular anti-entropy repair procedure, there is one repair_process state record and one repair_sequence record for each content server 110 included in the cluster 140. Further, for a particular anti-entropy repair procedure executing on a particular content server 110, there is one repair_status record per table of partitions and one repair_hook_status state table for each content server 110 included in the cluster 140. In various embodiments, each of the repair_process, repair_sequence, repair_status, and repair_hook_status state tables may exist on each cluster or in one master data store, in any technically feasible combination. In such embodiments, the master repair_status state table and one master repair_hook_status state table may be divided into multiple sections, where each section corresponds to a different content server 110 included in the cluster 140.

The first state table is the repair_process state table, which includes parameters for executing an anti-entropy repair procedure at the level of the entire cluster 140. The second state table is the repair_sequence state table, which defines the schedule for performing the anti-entropy repair procedure across the content servers 110 included in the cluster 140. The schedule is in the form of a sequence or order in which the nodes perform a node repair. In particular, the repair_sequence state table tracks the status of each content server 110 in the cluster 140 and indicates which content servers 110 have performed a node repair during the current anti-entropy repair procedure. The third state table is the repair_status state table, which tracks the repair status for specific elements included in each content server 110 included in the cluster 140. As further described herein, these specific elements include each of the partitions and subranges of data undergoing repair within a corresponding content server 110. The fourth state table is the repair_hook_status state table, which tracks the status of operations associated with post-repair procedures performed by the content servers 110. Such operations associated with post-repair procedures are referred to herein as "post-repair hooks."

In general, post-repair hooks include various maintenance tasks performed by a content server 110 once that content server 110 and all relevant neighbor content servers 110 have performed a node repair associated with the anti-entropy repair procedure. As used herein, the neighbors of a given content server 110 are the set of other content servers 110 included in the cluster that stores one or more partitions in common with the given content server 110. In general, a content server 110 cannot perform post-repair hooks until all other content servers 110 that share the same data have performed node repairs. This rule prevents data needed for node repair of neighboring content servers 110 from being deleted prior to completion of those node repairs. After a particular content server 110 and all relevant neighbor content servers 110 have performed a node repair, the particular content server 110 may store one or more partitions that were needed during repair but are no longer needed once the repair completes. Therefore, a cleanup hook deletes these partitions that are no longer needed.

Further, after a particular content server 110 and all relevant neighbor content servers 110 have performed a node repair, the particular content server 110 may store the repaired data in an inefficient manner. More specifically, during node repair, the content server 110 reads, writes, and copies blocks of data to and from various storage locations the system disk 206. As a result, once the node repair is complete, portions of a particular partition may be stored in random locations on the system disk 206, and/or the partition may include sections of free or unused storage space embedded within the partition. Retrieving partitions stored in such a manner may be time consuming, because the system disk 206 may need to retrieve data from storage locations that are distant from each other and may need to skip over sections of free or unused storage space. As a result of storing data in such an inefficient manner, an endpoint device 115 requesting data from the content server 110 after the repair completes may experience increased latency, relative to requests made prior to the repair. To reduce access latency, the processor 204 performs a compaction process to store partitions on the system disk 206 in a contiguous, linear manner with no internal sections of free or unused storage space. In particular, the processor 204 performs a compaction hook to store the data in a more efficient manner, thereby decreasing request latency.

In addition, any additional post-repair hooks may be defined by a user such that a particular content server 110 performs these additional post-repair hooks after the particular content server 110 and all relevant neighbor content servers 110 have performed a node repair. One such user-defined repair hook may transmit a message to a monitoring application (not shown) that the content server 110 has completed a node repair. In this manner, the monitoring application tracks progress of each content server 110 in the cluster 140 that is performing a repair and computes corresponding metrics, such as the time consumed during repair of the cluster 140.

The repair application 219 executes across the content servers 110 in distributed database network, where no content server 110 is designated in advance as an anti-entropy repair coordinator. In some embodiments, each content server 110 in a cluster 140 performs the repair application 219 periodically, such as once every two minutes. When executing the repair application 219, the content server 110 first retrieves data from the repair_process state table and/or the repair_sequence state table to determine whether an anti-entropy repair procedure is already in progress. If the data from the repair_process state table and/or the repair_sequence state table indicate that an anti-entropy repair procedure is in progress, then the content server 110 determines, from data in the repair_sequence state table, if that content server 110 is next in sequence to perform the node repair. If the data in the repair_sequence state table indicates that the content server 110 is next in sequence, then the content server 110 repairs the replicas and associated state tables and exits the repair procedure. If the data in the repair_sequence state table indicates that the content server 110 is not next in sequence, then the content server 110 determines whether the content server 110 is permitted to perform post-repair hooks related to the content server 110. The content server 110 is permitted to perform post-repair hooks is the data in the repair_sequence state table indicates that the content server 110 and all neighbor content servers 110 have completed node repair. If the content server 110 is permitted, then the content server 110 performs the post-repair hooks and exits the repair procedure. Otherwise, the content server 110 exits the repair procedure without performing the post-repair hooks.

If, on the other hand, the content server 110 determines that an anti-entropy repair procedure is not in progress, then the content server 110 determines whether a new anti-entropy repair procedure should be initiated. In general, a new anti-entropy repair procedure should be initiated if the previous anti-entropy repair procedure has completed and there are no restrictions on initiating new anti-entropy repair procedure. For example, initiation of a new anti-entropy repair procedure may be restricted to a time of day specified as off peak hours, where off peak hours represent a specified range of time when the load on the content servers 110 is expected to be below a specific threshold level. If a current time falls the specified range of time designated for repair operations, then a new anti-entropy repair procedure may be initiated. If a new anti-entropy repair procedure should not be initiated, the content server 110 exits the repair procedure. Otherwise, the content server 110 attempts to initiate a new anti-entropy repair procedure. The attempt is successful if the content server 110 can acquire a lock on data in the repair_procedure state table. If the content server 110 is unsuccessful in acquiring a lock on data in the repair_procedure state table, then another content server 110 has acquired the lock and is initiating a new anti-entropy repair procedure. If, however, the content server 110 is successful in acquiring the lock, the content server 110 populates the repair_process state table with cluster-level parameters. In addition, the content server 110 populates the repair_sequence state table with a new sequence for the content servers 110 to perform the new anti-entropy repair procedure. The content server 110 then exits the repair procedure.

In general, the only time that the content servers 110 coordinate with each other is when a content server 110 attempts to initiate a new anti-entropy repair procedure, populates the repair_process and repair_sequence state tables described above, and generates a new sequence that defines the sequence or order in which the content servers 110 perform node repairs related to the new anti-entropy repair procedure. When a content server 110 attempts to initiate a new anti-entropy repair procedure, the content server 110 requests a lock on the cluster-level repair_process state table. In this manner, multiple content servers 110 are prevented from simultaneously writing new repair_process and repair_sequence state tables for the next anti-entropy repair procedure. As a result, any content server 110 within the cluster 140 may acquire the lock on the repair_process state table and initiate the next anti-entropy repair procedure.

When the content server 110 acquires the lock, the content server 110 writes the machine-by-machine repair_sequence state table as a batch operation. In a batch operation write, either all of the writes are successful or none of the writes execute. In a batch operation, the content server 110 is prevented from writing a partial sequence to the repair_sequence state table and then failing, leading to a repair_sequence state table that includes partial sequences related to multiple anti-entropy repair procedures. Further, other content servers 110 are prevented from accessing the repair_sequence state table until the batch operation either completes or fails. As a result, other content servers 110 are ensured that the new repair_sequence state table is complete and consistent. By writing the repair_sequence state table in a batch operation, other content servers 110 are prevented from reading a partially written repair_sequence state table and, as a result, perform node repairs in the wrong sequence.

In short, any content server 110 may initiate a new anti-entropy repair procedure via two coordination states: (1) acquiring a lock on and writing to the repair_process state table; and (2) writing the repair_sequence state table in a batch operation. Other than these two coordination states, the content servers 110 perform the node repair independently without needing to coordinate with each other content servers 110 or to acquire locks in order to proceed.

Further, each content server 110 divides the set of partitions scheduled for repair into subranges. A given subrange may represent a single partition, multiple partitions, or a portion of a partition. Each content server 110 automatically splits and merges partitions into subranges in order to meet a target completion time to complete a repair. As one example, an anti-entropy repair procedure could have a target to complete a repair in no more than thirty minutes per subrange. Each subrange is automatically sized to meet this target completion time, based on the number of partitions and the size of the partitions stored in the content server 110. In general, an optimal set of repair_status state tables for a content server 110 in a cluster 140 that includes a large quantity of small partitions would be different from an optimal set of repair_status state tables for a content server 110 in a cluster 140 that includes a small quantity of large partitions.

In order to optimize the set of repair_status state tables, the content servers 110 perform an adaptive split range procedure. That automatically selects subranges based on the number of partitions, the size of the partitions, and other metrics. As one example, consider a cluster 140 that includes a million partitions, where each partition is a key-value pair. In order to find differences in the partitions across multiple content servers 110, each content server 110 included in the cluster 140 calculates a cryptograph cache of each of the components and generates a cache tree, referred to herein as a "Merkle tree." In a Merkle tree, each leaf includes a hash value of the data in a corresponding the partition or portion of a partition. Given two Merkle trees, one for a set of partitions on each of two content servers 110, if corresponding leaves on the two Merkle trees have the same hash value, then the corresponding source data are identical. Each content server 110 analyzes the Merkle tree across content servers 110 to find differences in the hash values stored in one Merkle tree versus the hashes stored in another Merkle tree. Such a difference corresponds to a difference in the source data represented by the hash values. However, generating a single Merkle tree for one million partitions may consume more memory than is available for performing the anti-entropy repair procedure.

One way to resolve this problem is to constrain the size of the Merkle tree to a reasonable number of hash values. However, constraining the size of the Merkle tree in this manner may result in a Merkle tree where each hash value represents a large number of partitions. If two corresponding hash values are different, then all of the partitions represented by the hash value need to be compared in order to find the data inconsistency.

Consequently, the content servers 110 perform an adaptive split range procedure, whereby the node repair is split into subranges, each subrange with a different Merkle tree. Each Merkle tree can have a one-to-one resolution, whereby each hash value represents a single partition. The multiple Merkle trees are computed concurrently. The adaptive split range procedure determines the number, size, and resolution of each Merkle tree based on a target completion time per Merkle tree, such as thirty minutes.

This adaptive split range procedure automatically adjusts the Merkle trees based on the underlying partitions in the cluster 140. For example, a first cluster 140 could have one million partitions where each partition is small. This cluster 140 would repair quickly because each hash value could be computed quickly, and each partition could be compared quickly. A second cluster 140 could have one million partitions where each partition is one Gigabyte. This cluster 140 would repair slowly because computing each hash value could take a long time, and comparing each partition could likewise take a long time. By adaptively selecting an appropriate split range, the target completion time of thirty minutes per subrange could be achieved. This adaptive selecting of split ranges allows faster recovery after a content server 110 failure.

In some embodiments, an anti-entropy repair procedure may automatically tune repair work based on historical data related to one or more previously executed anti-entropy repair procedures. In such embodiments, a content server 110 that is initiating a new anti-entropy repair procedure analyzes the data in the repair_status state table, as reported by each content server 110. This data identifies each subrange for each content server 110, the size of the subrange, and the amount of time consumed to repair that subrange. The state tables for the new anti-entropy repair procedure may then be adapted based on this data in order to meet a target completion time. As one example, if the prior anti-entropy repair procedure is performed in less time than the target completion time, then the split range for new anti-entropy repair procedure could be based on a target completion time that is double the actual completion time of the prior anti-entropy repair procedure. On the other hand, if the prior anti-entropy repair procedure is performed in more time than the target completion time, then the split range for new anti-entropy repair procedure could be based on a target completion time that is a fixed percentage less than the actual completion time of the prior anti-entropy repair procedure. In this manner, configurations for subsequent anti-entropy repair procedures adapt to changes in the nature of the partitions over time.

A set of repair options is now described. These repair options provide user controls to guide configuration and execution of anti-entropy repair procedures, including how the adaptive split range procedure is performed. The repair options are shown in Table 1 below:

TABLE 1

| Option | Description | Default |
| --- | --- | --- |
| type | The type of repair to run. Choices are full and incremental. | full |
| workers | Number of repair workers to run repairs with. Adjust this parameter before adjusting parallelism to improve repair speed. | max (1, #cores/2) |

TABLE 1-continued

| Option | Description | Default |
| --- | --- | --- |
| parallelism | The degree of parallelism in calculating Merkle trees. Choices are sequential, parallel, dc_parallel. | sequential |
| hooks | The set of post-repair hooks that should execute on a content server once the content server and all neighbors are done repairing. Available post-repair hooks include cleanup, compaction, and additional pluggable options. | ["cleanup"] |
| split_range | The number of partitions to split the repair_status state table into for the purpose of subrange. Value can either be an integer value, <integer>_dry_run or adaptive. If <integer>_dry_run, then the adaptive algorithm includes a split_range_adaptive field in the repair_status state table's config map to inspect before enabling adaptive. If adaptive, then the cluster automatically determines an optimal value. | adaptive |
| interrepair_delay_minutes | The delay between repair runs in minutes. The default depends on the type of repair being scheduled. Use this to "offset" repairs from each other, e.g. if it is known that repairs take 2 days, and the target is to complete a repair every 10 days, then setting a delay of ~3 days may be a good value. | full ->1440 (24 hours) incremental ->0 |
| process_timeout_seconds | The number of seconds to wait for another content server to state transition (e.g. generate a sequence, start repair, become healthy, etc. . . . ). Set this if many cancellations are observed. | 1800 (30 minutes) |
| repair_timeout_seconds | The number of seconds to wait for a single subrange repair to finish. Set this if many cancellations are observed. | 14400 (4 hours) |

The "type" repair option specifies the type of anti-entropy repair procedure to execute. In a full repair, the content servers 110 perform a repair on all partitions. In an incremental repair, the content servers 110 perform a repair only on the data that has changed. The default repair type is a full repair.

The "workers" repair option specifies the number of processor cores, also referred to herein as "workers," upon which to execute the repair. The default number of workers is the maximum of one core and the number of available cores divided by two. This default number of workers executes repair on at least one processor core but no more than the half of the number of available cores.

The "parallelism" repair option specifies the degree of parallelism employed when calculating Merkle trees for executing the repair. For a cluster 140 that includes three content servers 110 in each of three geographically diverse data centers, sequential causes each of the nine content servers 110 to build a Merkle tree sequentially, where only one content server 110 builds Merkle trees at any given time. Parallel causes the three content servers 110 in a given data center to simultaneously build Merkle trees. Data centers build Merkle trees sequentially, where only the content servers 110 in one data center build Merkle trees at any given time. Dc parallel causes all nine content servers 110 across all three data centers to simultaneously build Merkle trees. The default parallelism is sequential. Although sequential may be the slowest of the three options, sequential is also the most conservative in terms of data preservation.

The "hooks" repair option specifies the set of post-repair hooks to execute once the corresponding content server 110 and neighbor content servers 110 have completed node repair. Available post-repair hooks include "cleanup," "compaction," and any other user-supplied post-repair hooks. The default hook is cleanup.

The "split_range" repair option specifies a number of partitions to split the repair_status state table into for the purpose of subrange. If split_range specifies an integer 'n,' then the node repair executes such that each partition is split into 'n' subranges. If split_range specifies an integer 'n' followed by "_dry_run," then the node repair executes such that each partition is split into 'n' subranges and additional diagnostic data is stored in the repair_status state table. If split_range specifies "adaptive," then the node repair executes an adaptive split range process, as further described herein. The default split_range is adaptive.

The "interrepair_delay_minutes" repair option specifies an integer number of minutes to delay between the completion of one anti-entropy repair procedure and the initiation of the subsequent anti-entropy repair procedure. An interrepair_delay_minutes value of "full" indicates that the initiation of the subsequent repair occurs 1440 minutes (24 hours) after the completion of the prior anti-entropy repair procedure. An interrepair_delay_minutes value of "incremental" indicates that the initiation of the subsequent anti-entropy repair procedure occurs immediately after the completion of the prior anti-entropy repair procedure without delay.

The "process_timeout_seconds" repair option specifies an integer number of seconds to wait for another content server 110 to transition from one state to another state. The default process_timeout_seconds is 1800 seconds (30 minutes).

The "repair_timeout_seconds" repair option specifies an integer number of seconds to wait for a single subrange repair to complete. The default repair_timeout_seconds is 14,400 seconds (4 hours).

In various embodiments, two supplemental commands, referred to herein as "nodetools," are available for checking or changing the state of the currently executing repair procedure. The two supplemental commands include a repairstatus command to check the repair history of a content server 110 and a repairctl command to control repair of the cluster 140. Each of these nodetool commands are now discussed in further detail.

The structure of the repairstatus command is shown in Table 2 below:

TABLE 2

```
001 NAME
002    nodetool repairstatus - Print repair history information
003 SYNOPSIS
004    nodetool ... repairstatus
005         [--repair-id <repairid>] [--node-id <nodeid>]
006         [--keyspace <keyspace>] [--table <table>]
007 OPTIONS
008    --repair-id <repairid>
009         Show just repairstatus for the specified repair identifier.
010         If not specified, then show the latest repair status.
011    --node-id <nodeid>
012         The node identifier for which to retrieve repair status
013    --keyspace <keyspace>
014         Restrict to specified keyspace
015    --table <table>
016         Restrict to specified state table
```

Lines 001 and 002 specify the name "nodetool repairstatus" as the command to print repair history information. Lines 003 through 006 illustrate a synopsis of the repairstatus command, including four command options as shown in lines 005 through 006 and more fully described in lines 007 through 016. Lines 008-010 illustrate the repair-id command option. If repair-id is specified, then the repairstatus command returns the status for the specified repair identifier. If repair-id is not specified, then the repairstatus command returns the status of the entire repair. Lines 011-012 illustrate the node-id command option. The repairstatus command returns the status for the specified node identifier. Lines 013-014 illustrate the keyspace command option. The repairstatus command returns the status for the specified keyspace. Lines 015-016 illustrate the table command option. The repairstatus command returns the status for the specified state table.

For example, the command "nodetool repairstatus" without any command options would return a global view of the most recent repair status. The command "nodetool repairstatus—repair-id 12" would return the repair status of the repair with an identifier of 12. The command "nodetool repairstatus—node-id 73ab7e49" would return the repair status of the node with an identifier of 73ab7e49.

The structure of the repairctl command is shown in Table 3 below:

TABLE 3

```
001 NAME
002    nodetool repairctl - Control repair on the cluster
003 SYNOPSIS
004    nodetool ... repairctl
005         [--stop-cluster] [--start-cluster]
006         [--cancel-running]
007 OPTIONS
008    --stop-cluster
009         Pause repair on the entire cluster.
010         This does not cancel active executing repairs
011    --cancel-execution
012         Immediately halt any executing repairs on a given
              content server.
013    --start-cluster
014         Resume repair on the entire cluster.
```

Lines 001 and 002 specify the name "nodetool repairctl" as the command to control repair on a cluster 140. Lines 003 through 006 illustrate a synopsis of the repairctl command, including three command options as shown in lines 005 through 006 and more fully described in lines 007 through 014. Lines 008-010 illustrate the stop-cluster command option. If present, the stop-cluster option causes the repair on the entire cluster 140 to pause, without cancelling the execution of active repairs. Lines 011-012 illustrate the cancel-execution command option. The cancel-execution immediate halts any executing repairs on a given content server 110. Lines 013-014 illustrate the start-cluster command option. The start-cluster command resumes repair on the cluster 140.

For example, the command "nodetool repairctl—stop-cluster" would pause repair on the cluster 140 without cancelling any active repairs. The command "nodetool repairctl—start-cluster" would resume repair on the paused cluster 140. The command "nodetool repairctl—cancel-execution" would halt execution of any repair on a given content server 110. As a result, the remaining content servers 110 would begin to repair. This command option would stop a stuck content server 110 from preventing other content servers 110 from performing a node repair. The command "nodetool repairctl—stop-cluster—cancel-execution" would pause repair on the cluster 140 and halt execution of any repair on a given content server 110.

In some embodiments, an anti-entropy repair procedure may support exclusive repair schedules. In such embodiments, repairs may be restricted to initiate and/or execute only during certain periods of the time. For example, each datacenter in a cluster 140 could specify "off peak" hours that represent a specified range of time designated for repair operations. If a current time falls the specified range of time designated for repair operations, then a new anti-entropy repair procedure may be initiated. In general, the techniques described herein do not consume excessive CPU resources, memory, or network bandwidth. Even so, some users may wish to restrict repair to off peak hours in order to minimize impact on other data requests and network traffic. In other embodiments, a user may be able to suspend a repair or one or more post-repair hooks for a specified period of time.

In some embodiments, an anti-entropy repair procedure may support multiple repair schedules. In such embodiments, repairs may be of different types and may execute concurrently. The repair_sequence may include an additional field that specifies which the type of repair and/or configuration options to apply to the current repair, based on the repair type. As one example, full repairs and incremental repairs could be supported. In a full repair, the content servers 110 perform a repair on all partitions. In an incremental repair, the content servers 110 perform a repair only on the data that has changed. Therefore, a full repair could be executed once per month while an incremental repair could be executed once per day. Each incremental repair would repair partitions that differ due to writes. Each full repair additionally would repair partitions that differ due to data correction. In these embodiments, two repairs sequences could be executing simultaneously, but with different configurations. As a result, a full repair and an incremental repair could execute simultaneously, so long as a given content server 110 executes one node repair at a given time.

In some embodiments, an anti-entropy repair procedure for a large cluster 140 may be executed as a highly concurrent repair, where two or more content servers 110 may concurrently perform a node repair for the same anti-entropy repair procedure, referred to herein as a "drifted" or a "concurrent" repair. In such embodiments, multiple disjoint content servers 110 that do not share any ranges execute a node repair in parallel. At the point when a content server 110 determines whether the content server 110 next in sequence, the content server 110 may alternatively determine that proceeding to node repair would not negatively impact any neighbor content servers 110.

In some embodiments, a content server 110 may acquire a lock on the repair_process state table but may fail to proceed to generating a repair_sequence state table to initiate the next anti-entropy repair procedure. In such embodiments, one or more other content servers 110 in the cluster 140 may monitor progress of the content server 110 attempting to acquire the lock. If the content server 110 attempting to acquire the lock fails to generate a new repair_sequence state table within a configurable timeout period, such as thirty minutes, then another content server 110 may initiate the next anti-entropy repair procedure and cancel the failed anti-entropy repair procedure.

In some embodiments, a content server 110 may determine that the content server 110 is next in sequence but may fail to perform the node repair. In such embodiments, the content server 110 may continually generate and monitor heartbeat messages to the corresponding row in the repair_sequence state table to ensure that the content server 110 is making forward progress in the node repair. Other content servers 110 may also monitor the heartbeat messages. If the content server 110 currently attempting a node repair does not update the heartbeat message within a configurable timeout period, such as thirty minutes, then another content server 110 that is next in the repair_sequence state table may cancel all ongoing repairs of the stuck content server 110. This content server 110 then marks the status of the stuck content server 110 as CANCELLED in the repair_sequence state table and proceeds with the node repair.

In some embodiments, a given content server 110 may spend an excessive amount of time and CPU resources when performing a node repair or may generate an excessive amount of network traffic when performing a node repair. To resolve this issue, the content server 110 performs an adaptive split range function to adaptively divide repair work into subranges of work that are adapted to the size and number of partitions on the content server 110. The subranges are sized so that each subrange completes within a configurable timeout period, such as thirty minutes. If a repair on a particular subrange exceeds the timeout period by a specified amount, then the repair on that subrange may be canceled and rescheduled.

In some embodiments, the database may restart while a content server 110 is performing a node repair. In such embodiments, the content server 110 may resume node repair once the database restarts. Because each subrange of a repair is sized to complete within a configurable timeout period, such as thirty minutes, the amount of work lost due to a database restart is minimized. Once the database restarts, the content servers 110 that were in a STARTED state prior to the reset transition to a CANCELLED state in the repair_sequence state table and resume repair at the same state table and/or at the same subrange as when the database reset occurred. This process ensures that the node repair is completed in its entirety.

In some embodiments, a content server 110 may get stuck when performing post-repair hooks. In general, repairs need not be delayed due to failure of post-repair hooks to complete. Therefore, this issue may be resolved with aggressive timeout period to be applied to content servers 110 in the REPAIR_HOOK_RUNNING state. If the amount of time a content server 110 spends performing post-repair hooks exceeds the timeout period, then the content server 110 may be cancelled and restarted.

In some embodiments, content servers 110 may be added during execution of a repair. Because new content servers 110 do not impact the sequence of the current repair, the current repair continues to execute with the existing sequence. The subsequent repair then adds the new content servers 110 to the next repair_sequence state table.

In some embodiments, content servers 110 may be terminated or become unavailable during a repair. In such embodiments, one or more content servers 110 may monitor the health of other content servers 110 in the cluster 140. If a subrange for a given content server 110 is unavailable for a configurable timeout period, such as thirty minutes, then the status of the content server 110 is set to FAILED and the repair proceeds.

Figure 3:
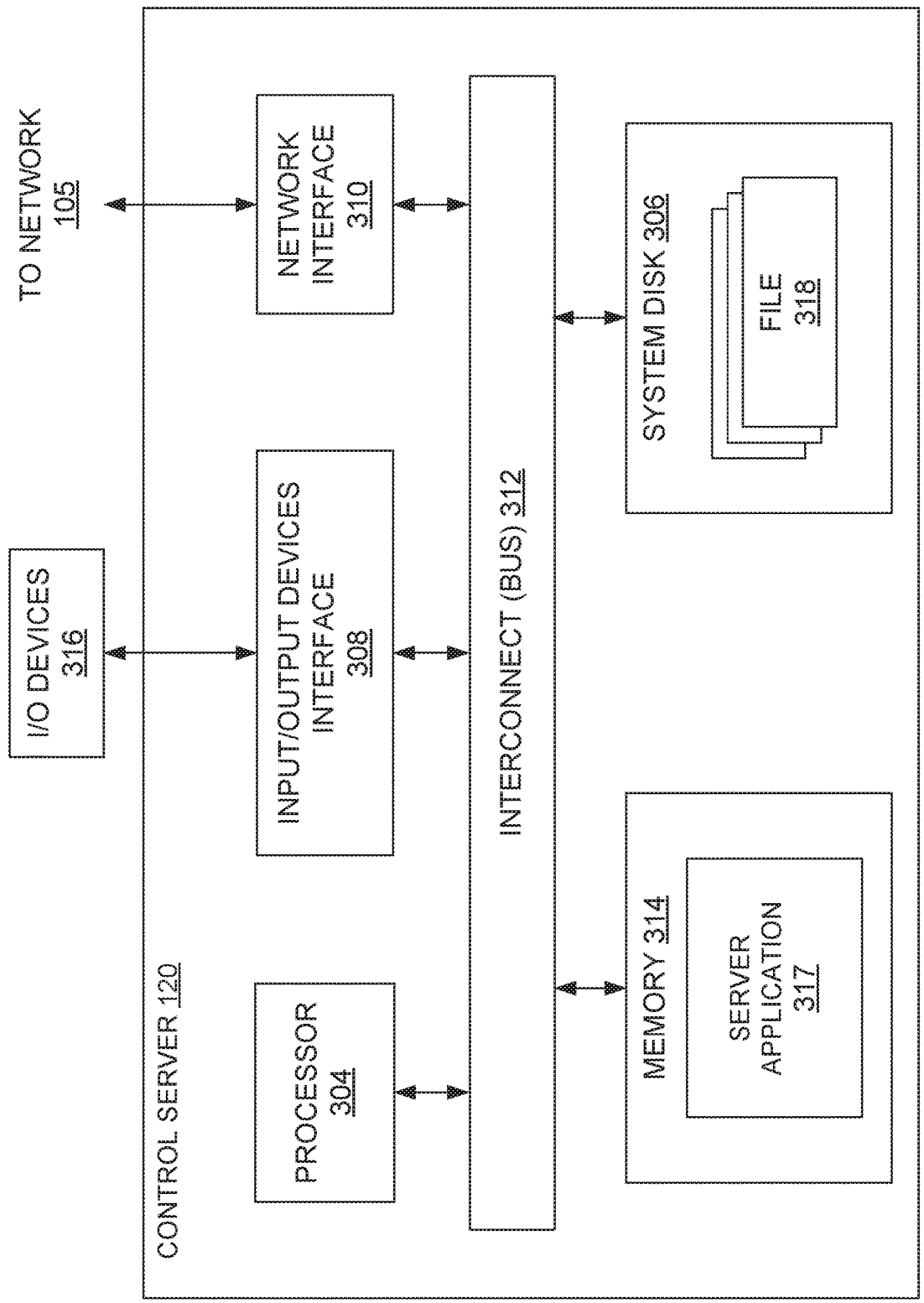
FIG. 3 is a more detailed illustration of the control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a processor 304, a system disk 306, an input/output (I/O) devices interface 308, a network interface 310, an interconnect 312, and a system memory 314.

The processor 304 is included to be representative of a single CPU, multiple CPUs, a single CPU having multiple processing cores, and the like. The processor 304 is configured to retrieve and execute programming instructions, such as a control application 317, stored in the system memory 314. Similarly, the processor 304 is configured to store application data (e.g., software libraries) and retrieve application data from the system memory 314 and a database 318 stored in the system disk 306. The interconnect 312 is configured to facilitate transmission of data between the processor 304, the system disk 306, the I/O devices interface 308, the network interface 310, and the system memory 314. The I/O devices interface 308 is configured to transmit input data and output data between the I/O devices 316 and the processor 304 via the interconnect 312. The system disk 306 may include one or more hard disk drives, solid state storage devices, and the like. The system disk 206 is configured to store a database 318 of information associated with the content servers 110, the fill source(s) 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
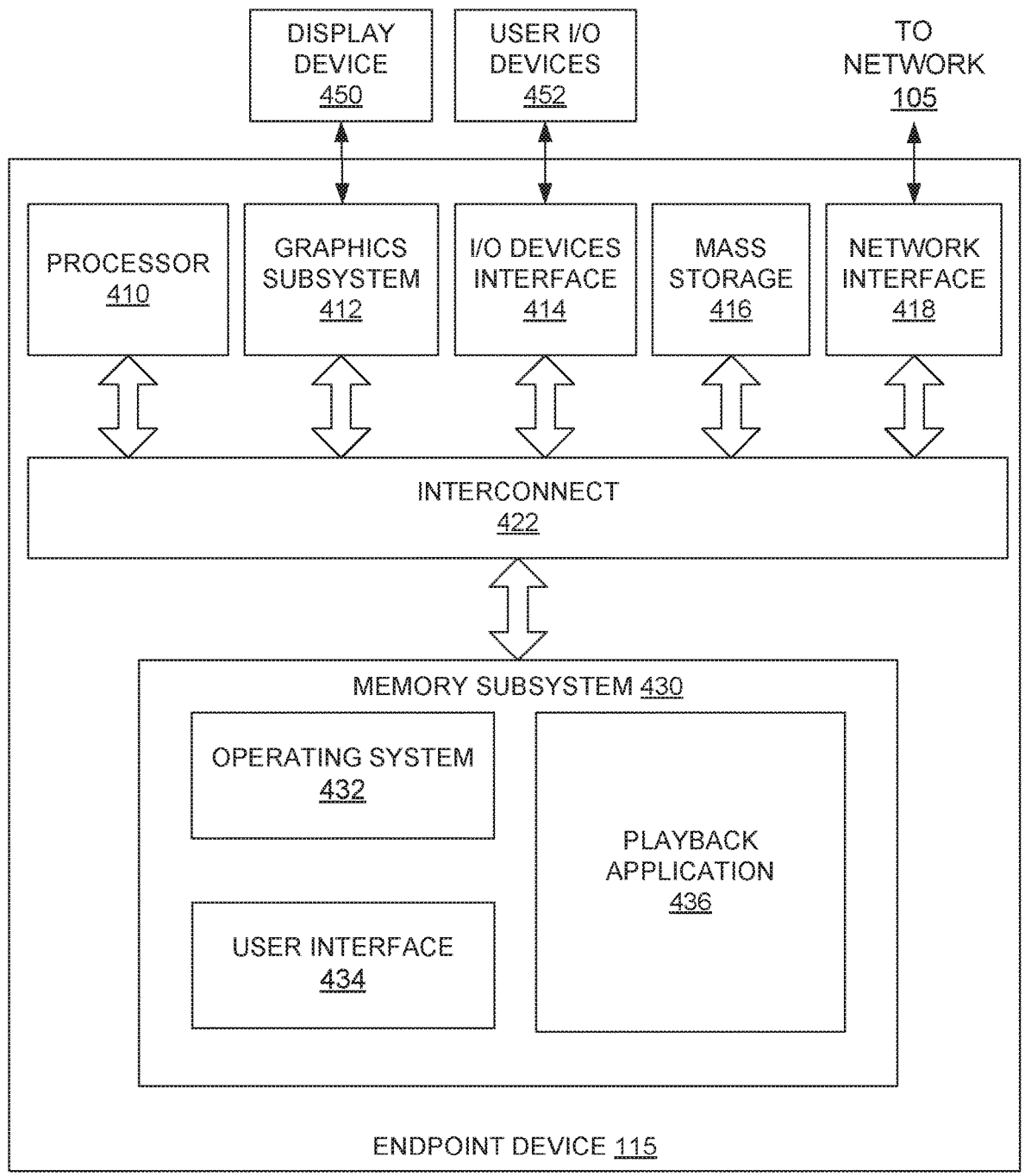
FIG. 4 is a more detailed illustration of the endpoint device that may be implemented in conjunction with the network infrastructure of FIG. 1, according to various embodiments of the present invention.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a processor 410, a graphics subsystem 412, an I/O device interface 414, a mass storage unit 416, a network interface 418, an interconnect 422, and a memory subsystem 430.

The processor 410 is included to be representative of a single CPU, multiple CPUs, a single CPU having multiple processing cores, and the like. In some embodiments, the processor 410 is configured to retrieve and execute programming instructions stored in the memory subsystem 430. Similarly, the processor 410 is configured to store and retrieve application data (e.g., software libraries) residing in the memory subsystem 430. The interconnect 422 is configured to facilitate transmission of data, such as programming instructions and application data, between the processor 410, the graphics subsystem 412, the I/O devices interface 414, the mass storage 416, the network interface 418, and the memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the processor 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) devices interface 414 is configured to receive input data from the user I/O devices 452 and transmit the input data to the processor 410 via the interconnect 422. For example, the user I/O devices 452 may comprise one or more buttons, a keyboard, and a mouse or other pointing device. The I/O device interface 414 also includes an audio output unit configured to generate an electrical audio output signal. The user I/O devices 452 include a speaker configured to generate an acoustic output in response to the electrical audio output signal. In alternative embodiments, the display device 450 may include the speaker. A television is an example of a device known in the art that can display video frames and generate an acoustic output.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the processor 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, the mass storage unit 416, the I/O devices interface 414, and the graphics subsystem 412. The operating system 432 also provides process and memory management models for the user interface 434 and the playback application 436. The user interface 434, such as a window and object metaphor, provides a mechanism for user interaction with the endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via the display device 450 and/or the user I/O devices 452.

Figure 5A:
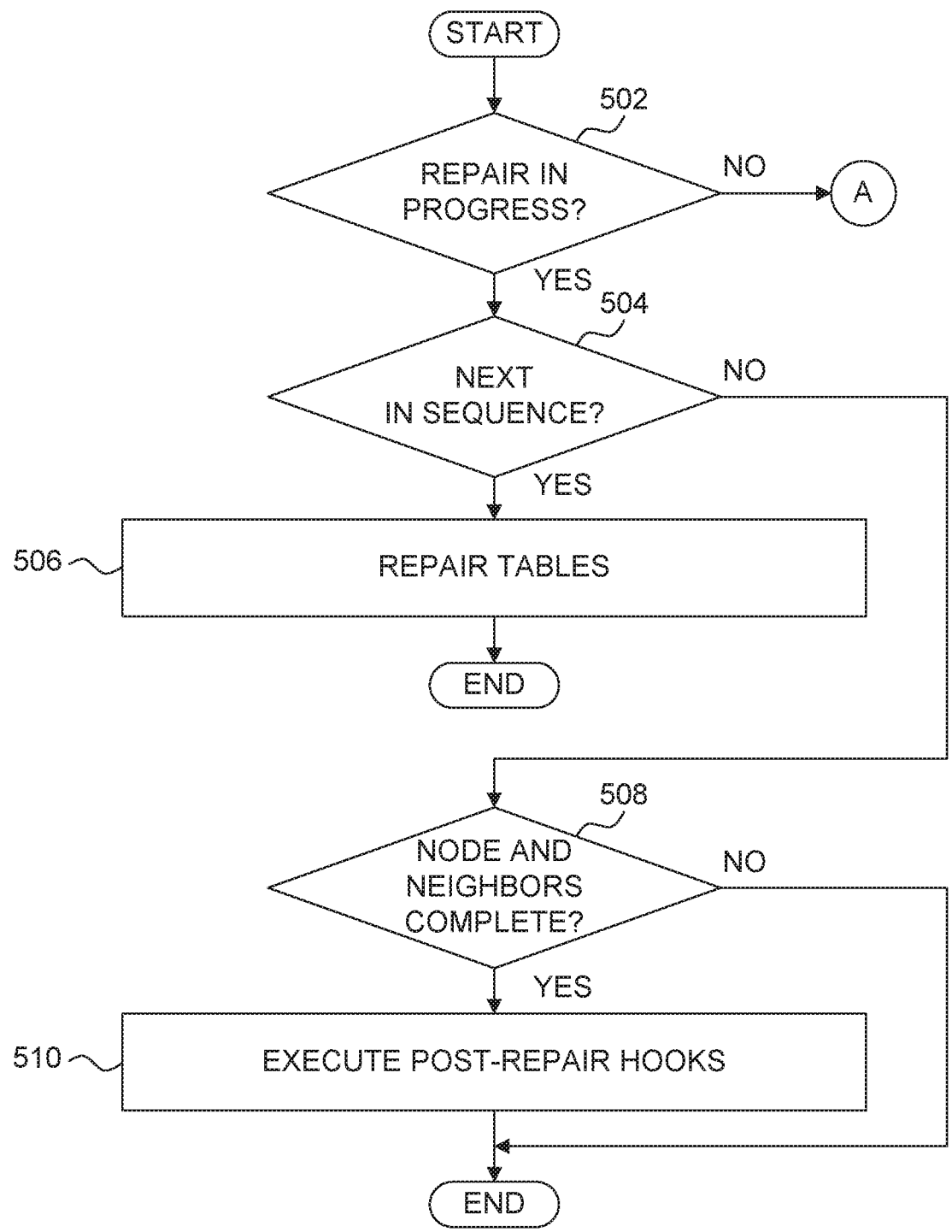
FIGS. 5A-5B set forth a flow diagram of method steps for performing distributed anti-entropy repair procedures across a plurality of content servers in a distributed database network, according to various embodiments of the present invention.
Figure 5B:
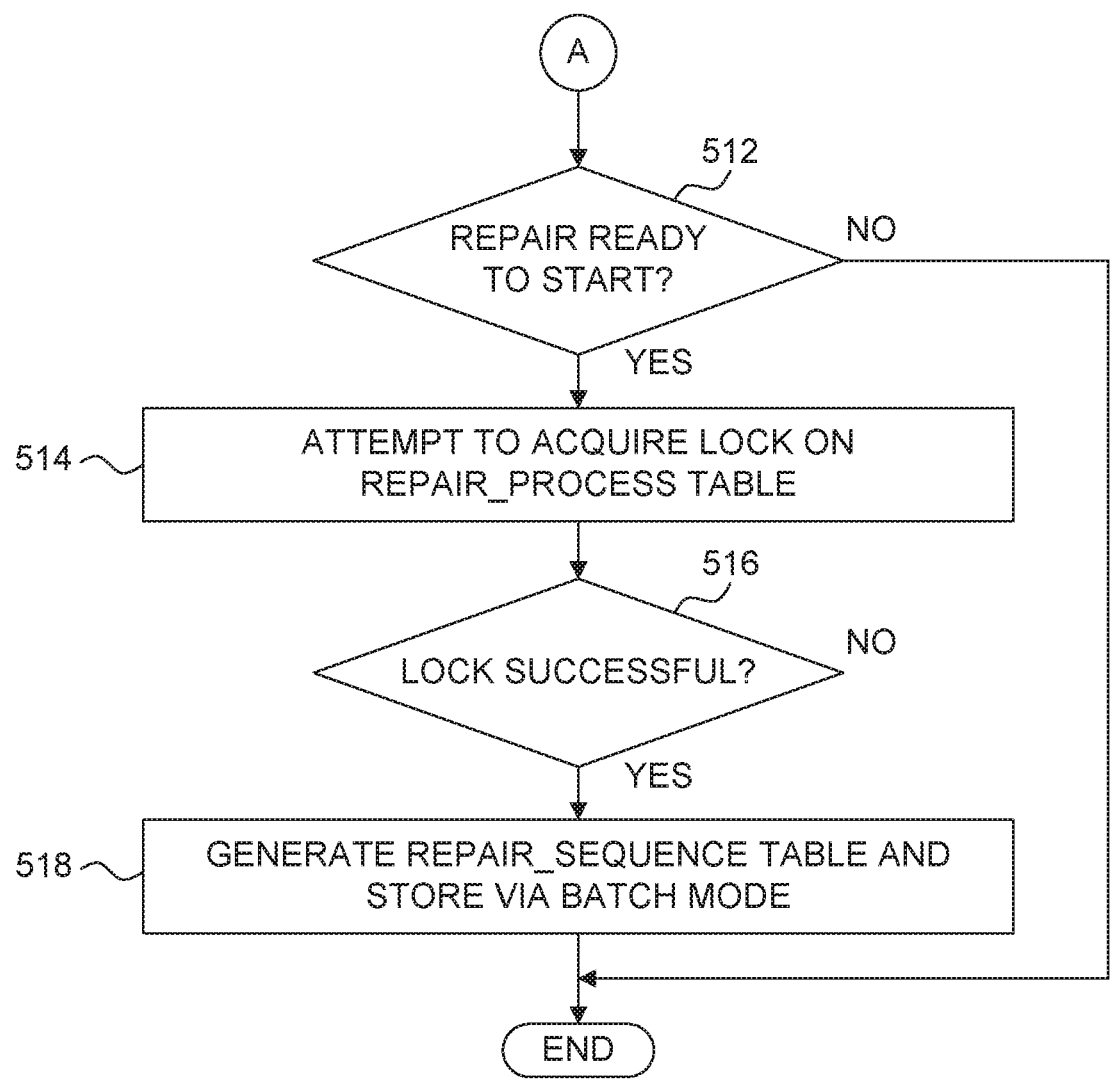

FIGS. 5A-5B set forth a flow diagram of method steps for performing distributed anti-entropy repair procedures across a plurality of content servers 110 in a distributed database network, according to various embodiments of the present invention. Although the method steps are described in conjunction with the systems of FIGS. 1-4, persons of ordinary skill in the art will understand that any system configured to perform the method steps, in any order, is within the scope of the present invention.

As shown, a method 500 begins at step 502, where a repair application 219 executing on a content server 110 determines if there is currently an anti-entropy repair procedure in progress. More specifically, the repair application 219 reads the cluster wide repair_process state table to determine whether the most recent anti-entropy repair procedure shows a status of complete or in progress.

If an anti-entropy repair procedure is currently in progress, then the method 500 proceeds to step 504, where the repair application 219 determines whether the content server 110 is next in sequence to perform a repair, as indicated by the repair_sequence state table. If all previous content servers 110 shown in the repair_sequence state table have a status of either FAILED or FINISHED, then the content server 110 is next in sequence. In such cases, the method 500 proceeds to step 506, where the repair application 219 performs a repair on partitions stored on the content server 110. More specifically, the repair application 219 performs a repair for each partition stored on the content server 110. If a partition has been split into multiple subranges, then the repair application 219 performs the repair one subrange at a time. After the repair application 219 completes the repair for all partitions and subranges stored on the content server 110, the method 500 then terminates.

If, however, at step 504, the content server 110 is not next in sequence, then the method proceeds to step 508, where the repair application 219 determines whether the current content server 110 and all neighbor content servers 110 of the current content server 110 have completed respective repairs. If the current content server 110 or at least one neighbor content server 110 of the current content server 110 has not completed repairs, then the method terminates. If, however, the current content server 110 and all neighbor content servers 110 have completed respective repairs, then the method 500 proceeds to step 510, where the repair application 219 executes post-repair hooks. As further described herein, such post-repair hooks perform cleanup and/or compaction operations as well as other maintenance tasks, such as transmitting a notification to a monitoring application that the current content server 110 has completed repair. The method 500 then terminates.

Returning to step 502, if an anti-entropy repair procedure is not currently in progress, then the method 500 proceeds to step 512, where the repair application 219 determines whether a new anti-entropy repair procedure is ready to start. In particular, the repair application 219 determines that there are no additional restrictions on initiating a new anti-entropy repair procedure, such as a minimum interval of time between two successive anti-entropy repair procedures or a time-of-day restriction to limit anti-entropy repair procedures to off-peak hours. If a new anti-entropy repair procedure is not ready to start, then the method 500 terminates. If, however, a new anti-entropy repair procedure is ready to start, then the method proceeds to step 514, where the repair application 219 attempts to acquire a lock on the repair_process state table. If the repair application 219 was not successful in acquiring the lock on the repair_process state table, then the method 500 terminates. If, however, the repair application 219 was successful in acquiring the lock on the repair_process state table, then the method 500 proceeds to step 518, where the repair application 219 generates the repair_sequence state table for the next anti-entropy repair procedure. The repair application 219 stores the repair_sequence state table in a batch operation. The method 500 then terminates.

In addition, as further described herein, each content server 110 in a cluster 140 performs the steps of the method 500 periodically, such as once every two minutes.

In sum, an anti-entropy repair procedure executes across the nodes in distributed database network, where no node is designated in advance as a anti-entropy repair coordinator. Each node periodically performs a technique, where the node first determines whether an anti-entropy repair procedure is in progress. If an anti-entropy repair procedure is in progress, then the node determines if that node is next in sequence to perform the repair. If the node is next in sequence, then the node repairs the replicas and associated state tables and exits. If the node is not next in sequence, then the node determines whether the node is permitted to perform post-repair procedures related to the node. If the node is permitted, then the node performs the post repair-procedures and exits. Otherwise, the node exits without performing the post-repair procedures.

If, on the other hand, the node determines that an anti-entropy repair procedure is not in progress, then the node determines whether a new anti-entropy repair procedure should be initiated. If a new anti-entropy repair should not be initiated, then the node exits. Otherwise, the node attempts to initiate a new anti-entropy repair procedure and, if successful, generates a new sequence that defines the sequence order that the nodes perform node repairs related to the new anti-entropy repair procedure. The node then exits.

At least one technical advantage of the disclosed techniques relative to the prior art is that anti-entropy repair procedures automatically scale to the number of nodes and to the varied size of the replicas in a distributed database network. As a result, the anti-entropy repair procedure adapts to each subset of data stored on a particular node in order to reduce the amount of disk access, CPU resources, and network bandwidth consumed, relative to conventional techniques. In addition, users are relieved from manually engineering and maintaining anti-entropy repair procedures as the number of nodes and the size of replicas change over time. Another technical advantage of the disclosed techniques relative to the prior art is that the anti-entropy repair procedure is distributed across the nodes. Further, once the failed nodes resume execution, the anti-entropy repair procedure may resume in relatively the same condition as when the failure occurred. Consequently, less or no repair progress is lost when one or more other nodes fail during a repair, relative to prior art approaches. These technical advantages represent one or more technological improvements over prior art approaches.

1. In some embodiments, a computer-implemented method comprises: determining, by a first node included in a plurality of nodes and before all other nodes included in the plurality of nodes, that a first anti-entropy repair procedure has ended; determining, by the first node, that a second anti-entropy repair procedure is ready to begin; generating a schedule for executing one or more operations associated with the second anti-entropy repair procedure; and writing the schedule to a shared repair schedule data structure to initiate the second anti-entropy repair procedure across multiple nodes included in the plurality of nodes.

2. The computer-implemented method according to clause 1, wherein determining that the second anti-entropy repair procedure is ready to begin comprises determining that a current time is within a specified range of time designated for repair operations.

3. The computer-implemented method according to clause 1 or clause 2, further comprising: determining, by a second node included in the plurality of nodes, that a third anti-entropy repair procedure is ready to begin; generating a schedule for executing one or more operations associated with the third anti-entropy repair procedure; and writing the schedule to a second shared repair schedule data structure to initiate the third anti-entropy repair procedure across multiple nodes included in the plurality of nodes.

4. The computer-implemented method according to any of clauses 1-3, wherein: the second anti-entropy repair procedure comprises a full anti-entropy repair procedure, the third anti-entropy repair procedure comprises an incremental anti-entropy repair procedure, and determining that the third anti-entropy repair procedure is ready to begin comprises determining that a fourth anti-entropy repair procedure that comprises an incremental repair has ended.

5. The computer-implemented method according to any of clauses 1-4, further comprising: determining, by a second node included in the plurality of nodes, that the second anti-entropy repair procedure is in progress; determining that the second node is next in sequence to be repaired; and repairing at least one inconsistent data partition that resides on the second node.

6. The computer-implemented method according to any of clauses 1-5, further comprising: determining, by a second node included in the plurality of nodes, that the second anti-entropy repair procedure is in progress; determining that the second node is independent from all other nodes included in the plurality of nodes that are currently performing a repair associated with the second anti-entropy repair procedure; and repairing at least one inconsistent data partition that resides on the second node.

7. The computer-implemented method according to any of clauses 1-6, further comprising: determining, by a second node included in the plurality of nodes, that the second anti-entropy repair procedure is in progress; determining that the second node has performed a repair associated with the second anti-entropy repair procedure; determining that all other nodes included in the plurality of nodes that are interdependent with the second node have performed a repair associated with the second anti-entropy repair procedure; and performing, by the second node, a post-repair procedure associated with the second anti-entropy repair procedure.

8. The computer-implemented method according to any of clauses 1-7, wherein performing the post-repair procedure comprises deleting a partition that is no longer needed after the second anti-entropy repair procedure is complete.

9. The computer-implemented method according to any of clauses 1-8, wherein performing the post-repair procedure comprises performing a compaction operation on one or more partitions associated with the second node to reduce latency when accessing the one or more partitions.

10. The computer-implemented method according to any of clauses 1-9, wherein performing the post-repair procedure comprises transmitting a message to a monitoring application indicating that the second node has performed the repair associated with the second anti-entropy repair procedure.

11. The computer-implemented method according to any of clauses 1-10, further comprising: determining that a number of partitions associated with the second anti-entropy repair procedure exceeds a threshold level; and dividing work associated with the second anti-entropy repair procedure into a plurality of subranges.

12. The computer-implemented method according to any of clauses 1-11, further comprising: determining that a size of one or more partitions associated with the second anti-entropy repair procedure exceeds a threshold level; and dividing work associated with the second anti-entropy repair procedure into a plurality of subranges.

13. The computer-implemented method according to any of clauses 1-12, further comprising: determining that a completion time for the second anti-entropy repair procedure exceeds a threshold level; and dividing work associated with the second anti-entropy repair procedure into a plurality of subranges based on the completion time.

14. In some embodiments, one or more non-transitory computer-readable storage media include instructions that, when executed by one or more processors, cause the one or more processors to perform the steps of: determining that a first anti-entropy repair procedure has ended; determining, by a first node included in a plurality of nodes and before all other nodes included in the plurality of nodes, that a second anti-entropy repair procedure is ready to begin; generating a schedule for executing operations associated with the second anti-entropy repair procedure; and writing the schedule to a shared repair schedule data structure to initiate the second anti-entropy repair procedure across multiple nodes included in the plurality of nodes.

15. The one or more non-transitory computer-readable storage media according to clause 14, wherein determining that the second anti-entropy repair procedure is ready to begin comprises determining that a current time is within a specified range of time designated for repair operations.

16. The one or more non-transitory computer-readable storage media according to clause 14 or clause 15, wherein each node included in the plurality of nodes sequentially performs a repair associated with the second anti-entropy repair procedure.

17. The one or more non-transitory computer-readable storage media according to any of clauses 14-16, wherein: each node included a first subset of nodes included in the plurality of nodes performs a repair associated with the second anti-entropy repair procedure in parallel with each other; each node included in a second subset of nodes included in the plurality of nodes performs a repair associated with the second anti-entropy repair procedure in parallel with each other; and the nodes included in the first subset of nodes perform the repair associated with the second anti-entropy repair procedure sequentially to the nodes included in the second subset of nodes.

18. The one or more non-transitory computer-readable storage media according to any of clauses 14-17, wherein each node included in the plurality of nodes performs a repair associated with the second anti-entropy repair procedure in parallel with each other.

19. In some embodiments, a computing device, comprises: a memory that includes instructions; and a processor that is coupled to the memory and, when executing the instructions, is configured to: determine that a first anti-entropy repair procedure has ended; determine, by a first node included in a plurality of nodes and before all other nodes included in the plurality of nodes, that a second anti-entropy repair procedure is ready to begin; generate a repair schedule associated with the second anti-entropy repair procedure; and write the repair schedule to a data store to initiate the second anti-entropy repair procedure across multiple nodes included in the plurality of nodes.

20. The computing device according to clause 19, wherein the processor, when executing the instructions, is further configured to assign, at a second node included in the plurality of nodes, a number of processing cores to perform a repair associated with the second anti-entropy repair procedure, wherein the number of processing cores is a maximum of one-half a number of available processor cores within the second node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    determining, by a first node included in a plurality of nodes and before all other nodes included in the plurality of nodes, that a first anti-entropy repair procedure has ended;
    determining, by the first node, that a second anti-entropy repair procedure is ready to begin;
    generating a first schedule for executing one or more operations associated with the second anti-entropy repair procedure, wherein the first schedule comprises a sequence in which one or more node repairs are performed by multiple nodes included in the plurality of nodes during the second anti-entropy repair procedure; and
    writing the first schedule to a shared repair schedule data structure to initiate the second anti-entropy repair procedure across the multiple nodes included in the plurality of nodes.

2. The computer-implemented method of claim 1, wherein determining that the second anti-entropy repair procedure is ready to begin comprises determining that a current time is within a specified range of time designated for repair operations.

3. The computer-implemented method of claim 1, further comprising:
    determining, by a second node included in the plurality of nodes, that a third anti-entropy repair procedure is ready to begin;
    generating a second schedule for executing one or more operations associated with the third anti-entropy repair procedure; and
    writing the second schedule to a second shared repair schedule data structure to initiate the third anti-entropy repair procedure across multiple nodes included in the plurality of nodes.

4. The computer-implemented method of claim 3, wherein:
    the second anti-entropy repair procedure comprises a full anti-entropy repair procedure,
    the third anti-entropy repair procedure comprises an incremental anti-entropy repair procedure, and
    determining that the third anti-entropy repair procedure is ready to begin comprises determining that a fourth anti-entropy repair procedure that comprises an incremental repair has ended.

5. The computer-implemented method of claim 1, further comprising:
    determining, by a second node included in the plurality of nodes, that the second anti-entropy repair procedure is in progress;
    determining that the second node is next in the sequence to be repaired; and
    repairing at least one inconsistent data partition that resides on the second node.

6. The computer-implemented method of claim 1, further comprising:
    determining, by a second node included in the plurality of nodes, that the second anti-entropy repair procedure is in progress;
    determining that the second node is independent from all other nodes included in the plurality of nodes that are currently performing a node repair associated with the second anti-entropy repair procedure; and
    repairing at least one inconsistent data partition that resides on the second node.

7. The computer-implemented method of claim 1, further comprising:
    determining, by a second node included in the plurality of nodes, that the second anti-entropy repair procedure is in progress;
    determining that the second node has performed a node repair associated with the second anti-entropy repair procedure;
    determining that all other nodes included in the plurality of nodes that are interdependent with the second node have performed one or more additional node repairs associated with the second anti-entropy repair procedure; and
    performing, by the second node, a post-repair procedure associated with the second anti-entropy repair procedure.

8. The computer-implemented method of claim 7, wherein performing the post-repair procedure comprises deleting a partition that is no longer needed after the second anti-entropy repair procedure is complete.

9. The computer-implemented method of claim 7, wherein performing the post-repair procedure comprises performing a compaction operation on one or more partitions associated with the second node to reduce latency when accessing the one or more partitions.

10. The computer-implemented method of claim 7, wherein performing the post-repair procedure comprises transmitting a message to a monitoring application indicating that the second node has performed the node repair associated with the second anti-entropy repair procedure.

11. The computer-implemented method of claim 1, further comprising:
determining that a number of partitions associated with the second anti-entropy repair procedure exceeds a threshold level; and
dividing work associated with the second anti-entropy repair procedure into a plurality of subranges.

12. The computer-implemented method of claim 1, further comprising:
determining that a size of one or more partitions associated with the second anti-entropy repair procedure exceeds a threshold level; and
dividing work associated with the second anti-entropy repair procedure into a plurality of subranges.

13. The computer-implemented method of claim 1, further comprising:
determining that a completion time for the second anti-entropy repair procedure exceeds a threshold level; and
dividing work associated with the second anti-entropy repair procedure into a plurality of subranges based on the completion time.

14. One or more non-transitory computer-readable storage media including instructions that, when executed by one or more processors, cause the one or more processors to perform the steps of:
determining that a first anti-entropy repair procedure has ended;
determining, by a first node included in a plurality of nodes and before all other nodes included in the plurality of nodes, that a second anti-entropy repair procedure is ready to begin;
generating a schedule for executing operations associated with the second anti-entropy repair procedure, wherein the schedule comprises a sequence in which one or more node repairs are performed by multiple nodes included in the plurality of nodes during the second anti-entropy repair procedure; and
writing the schedule to a shared repair schedule data structure to initiate the second anti-entropy repair procedure across multiple nodes included in the plurality of nodes.

15. The one or more non-transitory computer-readable storage media of claim 14, wherein determining that the second anti-entropy repair procedure is ready to begin comprises determining that a current time is within a specified range of time designated for repair operations.

16. The one or more non-transitory computer-readable storage media of claim 14, wherein each node included in the plurality of nodes sequentially performs a node repair associated with the second anti-entropy repair procedure.

17. The one or more non-transitory computer-readable storage media of claim 14, wherein:
each node included a first subset of nodes included in the plurality of nodes performs a first node repair associated with the second anti-entropy repair procedure in parallel with each other;
each node included in a second subset of nodes included in the plurality of nodes performs a second node repair associated with the second anti-entropy repair procedure in parallel with each other; and
the nodes included in the first subset of nodes perform the first node repair associated with the second anti-entropy repair procedure sequentially to the second node repair performed by the nodes included in the second subset of nodes.

18. The one or more non-transitory computer-readable storage media of claim 14, wherein each node included in the plurality of nodes performs a node repair associated with the second anti-entropy repair procedure in parallel with each other.

19. A computing device, comprising:
a memory that includes instructions; and
a processor that is coupled to the memory and, when executing the instructions, is configured to:
determine that a first anti-entropy repair procedure has ended;
determine, by a first node included in a plurality of nodes and before all other nodes included in the plurality of nodes, that a second anti-entropy repair procedure is ready to begin;
generate a repair schedule associated with the second anti-entropy repair procedure, wherein the repair schedule comprises a sequence in which one or more node repairs are performed by multiple nodes included in the plurality of nodes during the second anti-entropy repair procedure; and
write the repair schedule to a data store to initiate the second anti-entropy repair procedure across multiple nodes included in the plurality of nodes.

20. The computing device of claim 19, wherein the processor, when executing the instructions, is further configured to assign, at a second node included in the plurality of nodes, a number of processing cores to perform a node repair associated with the second anti-entropy repair procedure, wherein the number of processing cores is a maximum of one-half a number of available processor cores within the second node.

* * * * *